July 5, 1932.  C. C. GOOLSBEE  1,866,028
APPARATUS FOR APPLYING HARD FACING MATERIAL TO FISH TAIL BITS
Filed May 8, 1930  4 Sheets-Sheet 1
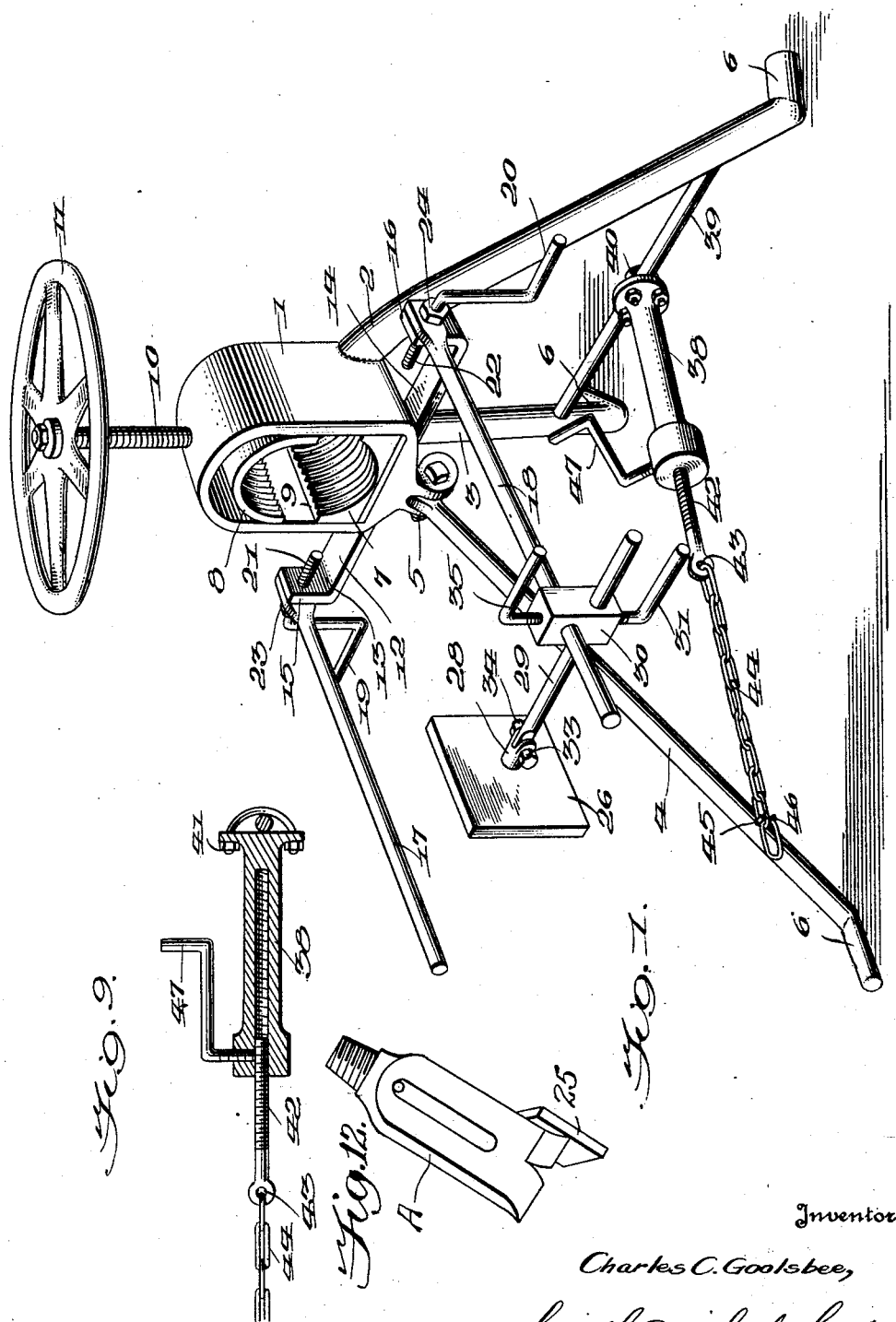
Inventor
Charles C. Goolsbee,
By Smith, Michael & Gardiner
Attorney July 5, 1932.  C. C. GOOLSBEE  1,866,028
APPARATUS FOR APPLYING HARD FACING MATERIAL TO FISH TAIL BITS
Filed May 8, 1930   4 Sheets-Sheet 2
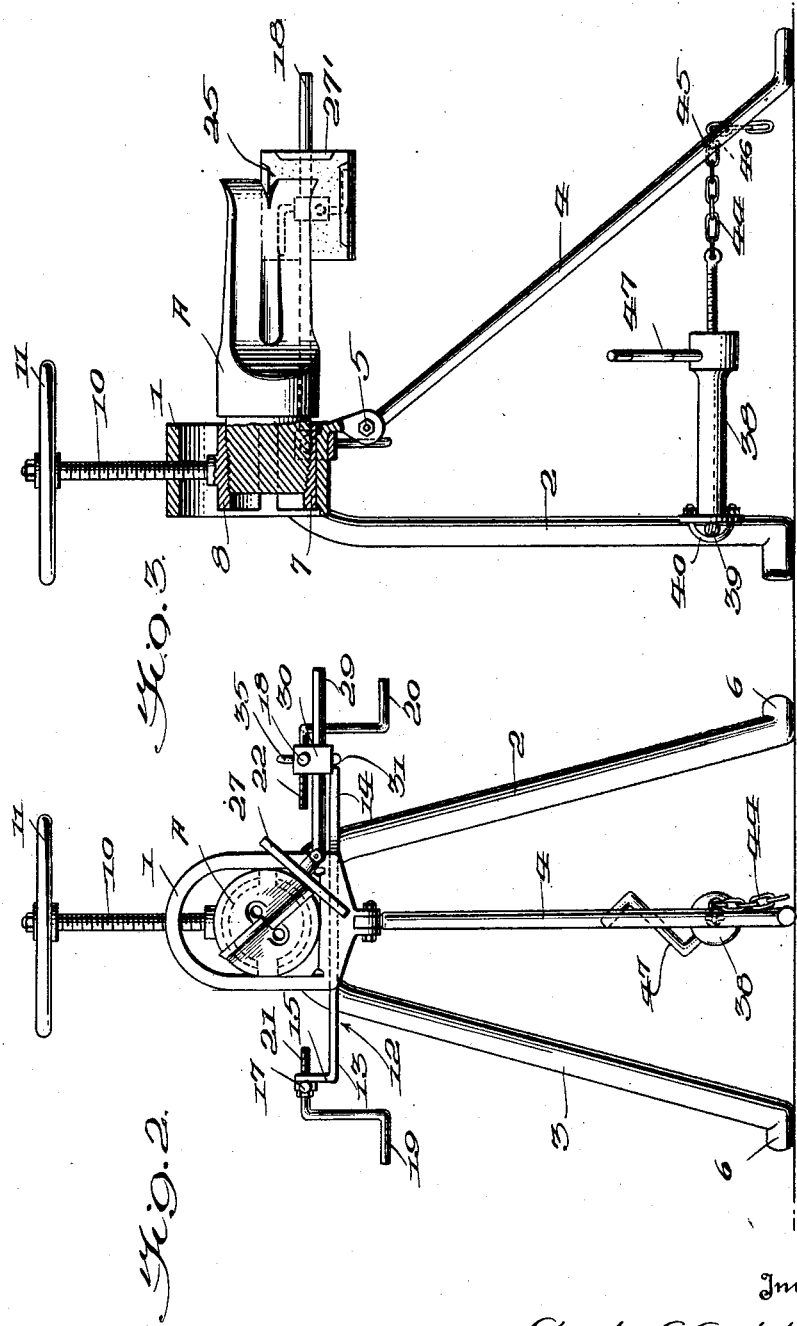
Inventor
Charles C. Goolsbee,
By Smith, Michael & Gardiner
Attorney

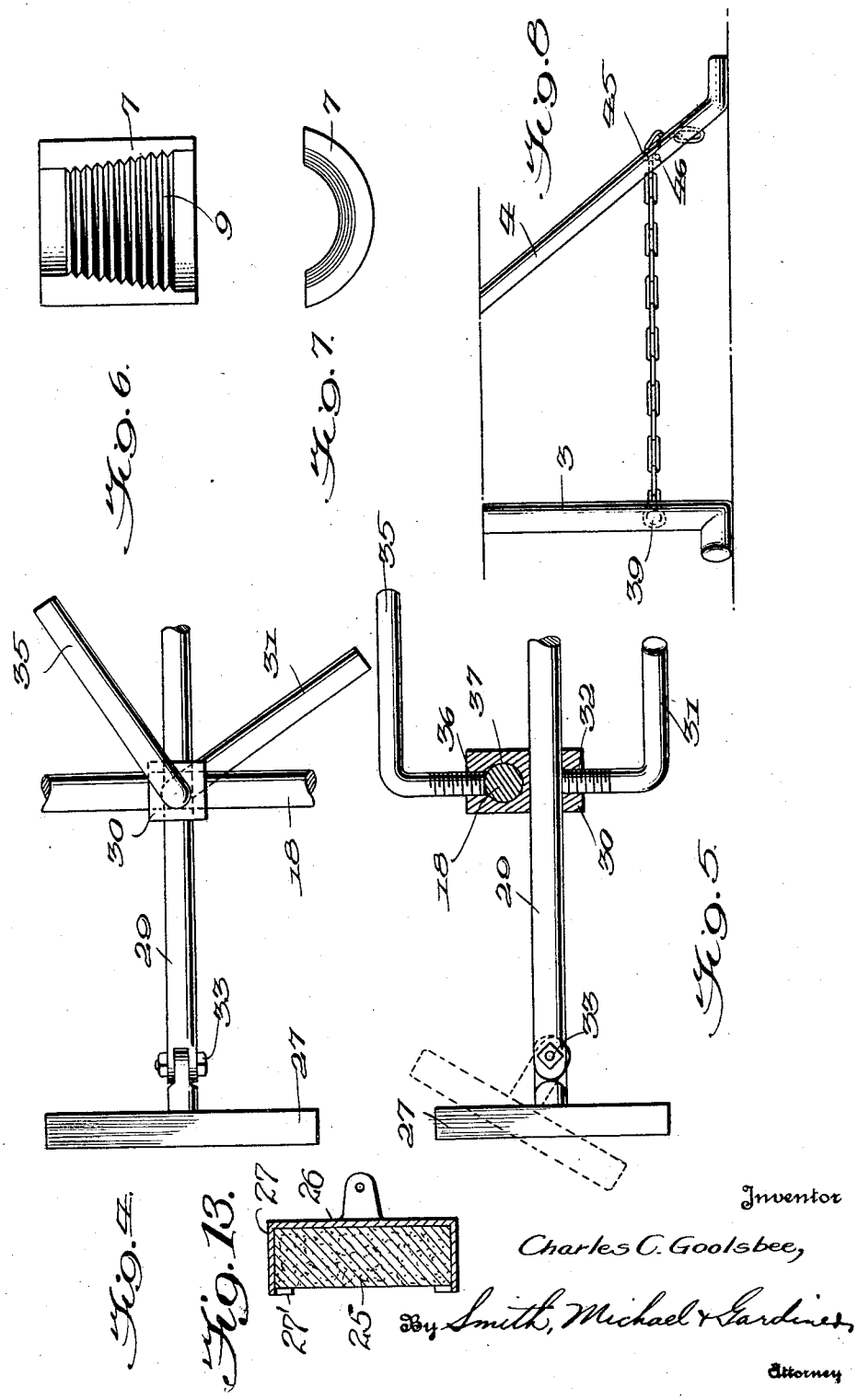

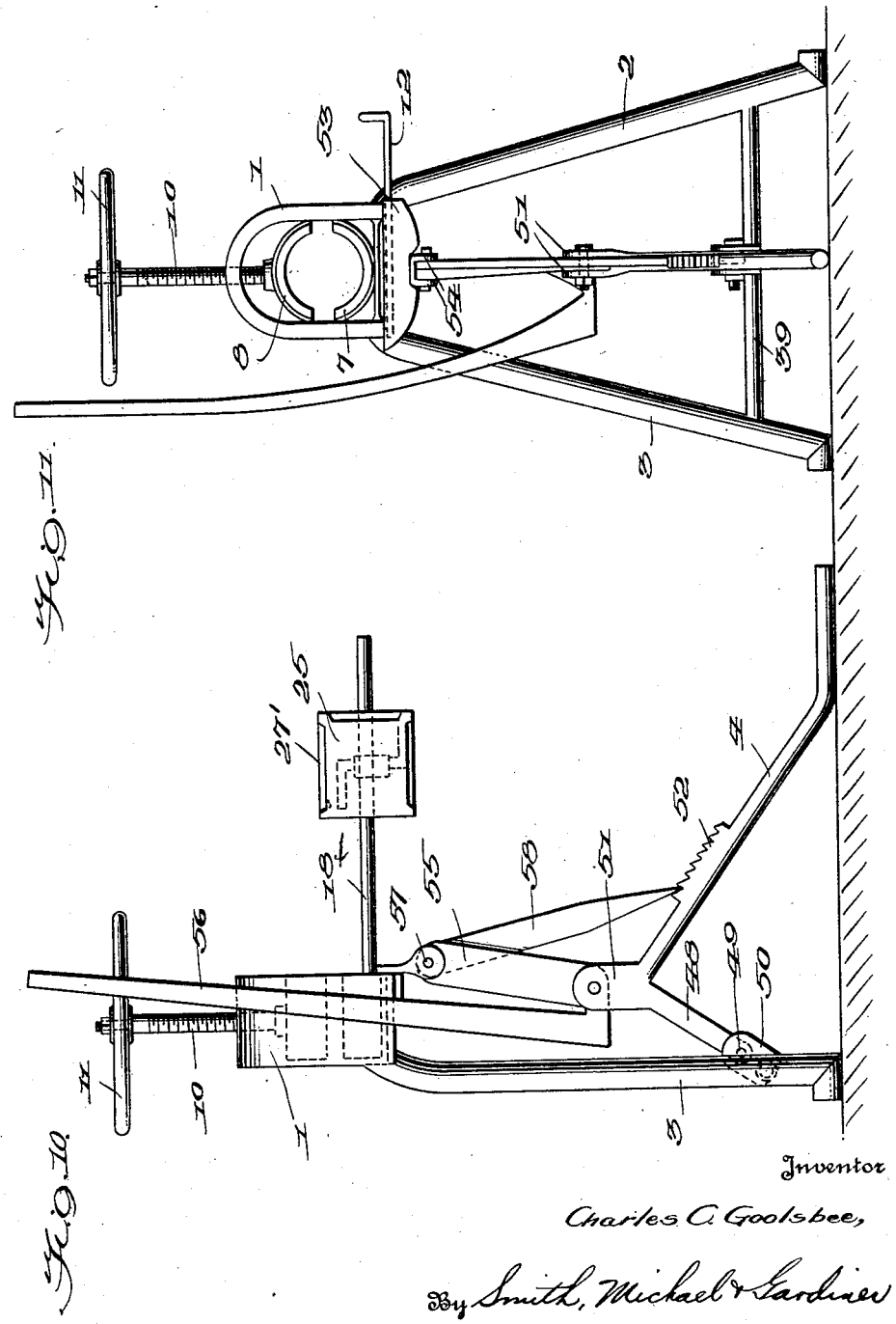

Patented July 5, 1932

1,866,028

UNITED STATES PATENT OFFICE

CHARLES CULBERSON GOOLSBEE, OF HOUSTON, TEXAS

APPARATUS FOR APPLYING HARD FACING MATERIAL TO FISH-TAIL BITS

Application filed May 8, 1930. Serial No. 450,864.

This invention relates to a method of an apparatus for applying hard facing material to drill bits and the like.

In the oil fields where drilling is being constantly undertaken, it is a source of great expense and annoyance to maintain the drill bits in proper condition. At the present time after a drill bit has been used for a relatively short time it is found that the edges become worn and dull and that they have to be faced with a hard wearing surface before continued use of the same is found feasible.

The methods, as known, so far, are extremely crude and necessitate expenditure of a large amount of time with consequent delay in again preparing the drill bits for further use. Therefore, any method or mechanical device that will assist in applying the hard facing to the bits is of considerable importance. In applying this hard facing material to the bits consideration must be given to the speed of the operation as well as the saving of the alloy which is used for refacing the bits and the elimination of as much grinding as possible after the alloy has been applied. By providing for all of these factors the expense of the drilling operation is materially reduced and it is possible to use and reuse a single bit a number of times.

In carrying out the present process the cutting edges of the bits are supported in such a manner that they are inclined longitudinally and transversely and the support is of such character that the angularity of the bit may be readily changed depending upon the viscosity of the alloys employed and the penetration desired.

The process further consists in limiting the flow of the alloy across the cutting edges of the bit so that it will be maintained to gauge and will eliminate the necessity of grinding or otherwise removing burrs from the sides of the cutting faces.

It is believed to be obvious that by varying the inclination of the cutting edges both longitudinally and transversely the proper flow of alloy across the cutting edges can be secured and the width of the hard facing material with reference to the longitudinal extent of the cutting edges can be controlled as well as the penetration.

In the accompanying drawings, I have illustrated two forms of apparatus suitable for carrying out the foregoing process and while these forms have been found very successful in operation it is to be understood that they are illustrated merely by way of example and are not to be taken as limiting the present invention.

In describing the apparatus employed, reference will be had to the accompanying drawings in which corresponding parts are similarly numbered throughout the several figures:

Fig. 1 is a perspective view of my invention.

Fig. 2 is a front elevation with a bit in position.

Fig. 3 is a side elevation, parts thereof being shown in section, with a bit clamped in horizontal position.

Fig. 4 is a fragmentary plan view of the carbon block support and its adjusting mechanism, the support therefor being broken away.

Fig. 5 is a fragmentary side elevation of the carbon block support and its associated mechanism partially in section.

Fig. 6 is a plan view of one of the clamping jaws.

Fig. 7 is an edge view of the same.

Fig. 8 is a fragmentary view of one form of adjustment for the legs of the supporting member.

Fig. 9 is an additional form of leg adjustment.

Figs. 10 and 11 are side and front elevations respectively of my invention illustrating still another form of adjustment for the front leg of the support.

Fig. 12 is a view showing generally the relation between the bit and carbon block when in use.

Fig. 13 is a vertical sectional view taken centrally through the carbon block 25 of Fig. 10.

More specifically, the apparatus for carrying out the present process can be said to constitute a tripod comprising a body 1 provided with downwardly diverging rear legs 2 and 3 rigidly secured to said body, and an adjustable front leg 4 pivoted to the body at 5 so that by moving the front leg with reference to the rear legs a change in the angle of inclination of the body 1 may be produced and consequently the bit, which is adapted to be supported by the body 1, is inclined longitudinally.

The lower extremities of the legs 2, 3 and 4 are bent to form feet 6 which furnish stable support and prevent the legs from penetrating the surface on which the device is supported.

Within the body 1 are located gripping jaws 7 and 8 both of which are internally threaded as at 9 to mesh with the threads on the shank of the bit being welded.

The jaw 7 is held stationary on the bottom of the body 1 in any suitable manner and the jaw 8 is vertically adjustable therein by means of the screw 10 swiveled to the jaw 8 and projected through the top of the body 1. The screw 10 is operated by means of the hand wheel 11 for raising and lowering the movable jaw 8 to accommodate the same to bits of varying diameters.

In Figs. 2 and 3 I have illustrated the device as it is actually used with a fish-tail bit clamped between the jaws 7 and 8 and the cutting edges of the bit projecting in the direction of the front leg 4.

It will be seen, therefore, that the cutting edges of the bit to be welded are supported away from the body 1 so as to be clearly visible and readily accessible during the facing operation, thereby enabling adjustment of the various parts to suit the particular condition of the bit.

By locating the cutting edges of the bit in a readily accessible position, it is to be seen that the quality of the work is influenced since the desire to complete the job under awkward conditions is eliminated.

To the base of the body 1 a bar 12 is secured intermediate its ends to provide outwardly projecting arms 13 and 14 extending transversely of and in opposite directions from the body 1 and having their free ends bent upwardly to form ears 15 and 16.

Supporting rods 17 and 18 are secured to the respective ears 15 and 16 and extend longitudinally forwardly of the body 1.

The rods 17 and 18 are pivotally secured to the ears 15 and 16 by means of handles 19 and 20 having threaded ends 21 and 22 passing through openings in the rear ends of the rods 17 and 18 and threading into openings in the ears 15 and 16.

Lock nuts 23 and 24 cause the rods 17 and 18 to be jammed against the ears 15 and 16 so that the rods are held in any desired position.

By reference to Fig. 1, it will be seen that the rods 17 and 18 are supported on opposite sides of the body 1 and that the angle of inclination of the rods 17 and 18 can be varied to compensate for variations in the angle of the front leg 4.

Supported on either one or the other of the rods 17 and 18 is a carbon block support 26, and while the carbon block support is illustrated in Fig. 1 as being supported by the rod 18, it is to be understood, that the block may be carried by the rod 17 depending upon which edge of the cutting blade is being operated upon.

The block of carbon or similar material indicated at 25 is mounted on the support 26 and held in place thereon by integral upstanding flanges 27 connected to the base of the support which terminate in overhanging lips 27' as shown in Figs. 3 and 10. The base of the block support 26 is provided on its rear face with a bifurcated stud 28 which is adapted to pivotally receive a shaft 29 adjustably secured in the block 30 by means of the threaded handle 31 threading into an aperture 32 in the block 30 until the end thereof engages the shaft 29, whereupon the block is held securely in position.

The block 25 is likewise adapted to be adjusted with respect to shaft 29 and is held in its adjusted positions by means of the bolt 33 and lock nut 34 so that the angle of inclination of the block 26 can be varied with respect to the shaft 29, and to engage the sides of the cutting edges of the bit in its various adjusted positions.

From the foregoing, it will be seen that by loosening the handle 31 the shaft 29 can be slid through the block 30 to determine the degree of projection of the carbon block 25.

The carbon block 25 can likewise be moved along the rods 17 or 18 toward or away from the body 1 as desired.

This is accomplished by turning the handle 35 threaded into a second opening 36 in the block 30 and having its end engaging either of the rods 17 or 18 when in locked position, it being understood that the rod 18 passes through an opening 37 in the block 30.

From the description so far, it can be readily seen that after a bit has been clamped between the jaws 7 and 8, the front leg 4 may be adjusted to incline the bit longitudinally to any desired degree and that after this adjustment has been made the carbon block 25 can be adjusted along the rods 17 or 18, as the case may be, so that the carbon block will lie adjacent the side edges of the cutting blades of the bit. By loosening the handle 31 the shaft 29 can be moved through the block 30 so as to cause the carbon block 25 to engage the side edges of the cutting blades and furthermore the angularity of the carbon block itself can be adjusted so that as the alloy is flowed across the cutting edges it engages the carbon block and maintains the alloy true to gauge so that no projecting burrs extend from the side edges of the cutting faces.

In addition to the foregoing adjustments, the rods 17 and 18 are independently adjustable by means of the handles 19 and 20 so that a device is provided that is extremely flexible in operation and permits all adjustments to be accomplished quickly and easily.

In order to adjust the angularity of the front leg 4 I have illustrated several forms.

The preferred form is illustrated in Figs. 1 and 9 and consists of a socket member 38 which is secured to a cross rod 39 extending between the rear legs 2 and 3 by means of a yoke 40 which surrounds the rod 39 and is secured to the base of the socket member by means of nuts 41.

Slidably secured in the socket member 38 is a screw 42 having an eye 43 at the outer end thereof to receive the links of a chain 44 and the opposite end of the chain 44 is secured to the front leg 4 by means of the spaced pins 45 and 46 between which the links of the chain are adapted to wedge.

The screw 42 is held in adjusted position in the socket member 38 by means of the handle 47 which is threaded into the socket member and engages the screw 42.

Therefore, by loosening the handle 47 and moving the screw 42 in or out of the socket the leg 4 is adjusted, and when the proper adjustment has been made tightening of the handle 47 will maintain the leg 4 and consequently the body 1 in the desired angular position.

In Fig. 8 I have illustrated a simple form of adjustment for the front leg 4 which consists in securing one end of a chain to the cross rod 39 and passing the other end of the chain between spaced lugs 45 and 46 on the front leg 4.

Referring now to Figs. 10 and 11 I have illustrated a further modification of my invention with particular reference to the adjustment of the front leg 4.

In these views it is to be understood that the construction of the body 1 and the rear legs together with its associated mechanism is the same as previously described, but in this form the carbon block is adapted to be supported on one side of the machine only by means of a single transverse rod 12, the support for and the adjustment of the carbon block being unchanged.

In this form of the invention the front leg 4 has an angular extension 48 pivoted at 49 to a link 50 which is pivotally secured on the cross rod 39 extending between the rear legs.

The leg 4 is likewise provided with spaced upstanding ears 51 integrally formed therewith and carries a rack 52 on the downwardly inclined face of the front leg 4.

Secured to the body 1 is a skirt 53 having bifurcated lips 54 to pivotally receive the upper end of an extension 55 integral with the handle 56, the lower end of the extension 55 being pivotally secured between the upstanding ears 51.

Pivotally secured between the lips 54 by means of the bolt 57 is a pawl 58, which falls by gravity into mesh with the rack 52 and thereby supports the front leg 4 at the desired angle.

In this case the adjustment of the front leg is accomplished merely by operation of the handle 56, it being understood that operation in one direction causes the pawl 58 to trail over the rack 52 and that weight of the bit clamped within the body member 1 will securely hold the pawl in engagement with the rack. In order to operate the handle in the opposite direction the pawl 58 must be lifted from the rack and held in such position until the desired adjustment has been made whereupon the pawl 58 again falls into engagement with the rack 52.

Having now described in detail the apparatus involved it can be readily understood from an examination of Figs. 2 and 3 that after the bit A has been clamped in place the angularity of the front leg is adjusted to cause the bit A to assume a longitudinally inclined position, after which the carbon block 25 is adjusted so that the face thereof engages the side edges of the cutting members and the bit A is rotated axially until the desired transverse inclination of the blades have been obtained. Having assumed such a position, the alloy is flowed across the cutting edges of the blade until it engages the carbon block.

After the fish tail bit has been suitably adjusted in the vise and the carbon block set in its predetermined position, it will be seen that the fish tail bit is centered therein so that the bit can be hard faced with reference to a true center.

In ordinary practice, fish tail bits are not properly positioned when being hard faced so that the two cutting edges do not have the material applied equally thereto with relation to the true center of the bit and consequently one cutting edge of the bit may be built up with more hard facing material than the other. When such an unequally faced bit is used one cutting edge gives away before the other which frequently contributes largely to the drilling of crooked holes with fish tail bits. The present invention prevents the unequal application of hard facing material due to the fact that it is centered in the support and after one cutting edge of the bit has been built up against the block the desired amount, the bit can be revolved through 180° thereby bringing the other cutting edge against the carbon block and the second cutting edge can then be built up an amount equal to that of the first cutting edge. During this entire operation both cutting edges have been built up equally with hard facing material with reference to a definite center of the bit.

By careful examination it can be ascertained by the operator whether the alloy is penetrating the cutting edges sufficiently and whether or not the transverse inclination of the cutting edges is sufficient to cause the metal to flow thereacross properly. If not, it is simply necessary to release the jaw 8, rotate the bit A to secure the desired inclination transversely and to adjust the front leg to vary the longitudinal inclination of the blade until the desired position has been obtained to insure proper flow and penetration of the alloy.

It is to be understood that some alloys are much more fluid than others and consequently flow with greater ease. When such alloys are employed, very slight transverse angularity is needed but where extremely viscous alloys are employed greater angularity is found to be necessary, due to the natural resistance to flow of such viscous alloys.

The process, therefore, consists in supporting a bit at suitable degrees of inclination both longitudinally and transversely, flowing a hard facing alloy across the surface of the cutting edges of the bit and varying the inclination of the cutting edges both longitudinally and transversely depending upon the viscosity of the alloy employed and the penetration desired.

Either arc welding or oxy-acetylene welding processes can be used with the present apparatus and it has been found in actual practice that with the present process and apparatus a 9⅞" bit can be refaced in about fifteen minutes. This includes the preparatory grinding, the putting in and taking out of the bit from the vise and the finishing. In other words, with a welder and grinder on the job and with facilities for swinging the bit into place, one bit of the above mentioned size can be completely renovated and turned out ready for use every fifteen minutes. The actual welding time is, of course, less than that.

The carbon block which is one of the salient features of the present invention has been found to be very durable and to keep in good shape for about seventy-five hard facing jobs and their renewal is a negligible expense.

In view of the fact that present day methods are quite laborious and necessitate considerably longer intervals of time it can be seen that the present invention is a decided advance in the art and that the apparatus employed is a very durable construction which can be manufactured inexpensively.

I claim:

1. In an apparatus for applying hard facing alloys to drill bits and the like, the combination of a support for said bit, means for securing said bit on the support and a carbon block carried by said support and engaging the sides of the cutting edges of said bit.

2. In an apparatus of the character described, the combination of a support, clamping jaws on said support for supporting a drill bit, a carbon block secured on said support and positioned to engage the sides of the cutting edges of said bit, and means for adjusting said carbon block to accommodate bits of varying size.

3. In an apparatus of the character described, the combination of a support including legs, clamping jaws on said support for supporting a drill bit, a carbon block secured to said support and engaging the sides of the cutting edges of the bit and means for adjusting one of the legs of said support to maintain the drill bit at varying angles of longitudinal inclination.

4. In an apparatus of the character described, the combination of a support for a drill bit, means for securing said bit in said support with its cutting edge inclined both longitudinally and transversely, and a carbon block engaging the side of the cutting edge at any and all degrees of inclination thereof.

5. In an apparatus of the character described, a support for drill bits, and a carbon block engaging the side of the cutting edge thereof, said block being mounted on said support so as to be adjustable longitudinally, transversely and vertically.

6. In an apparatus of the character described, a support for drill bits, means for adjustably securing the bit in said support with a cutting edge in transversely inclined position, a carbon block engaging the side of said cutting edge, and means for varying the inclination of said carbon block so that it lies in a plane at right angles to the plane of the cutting edge of the bit.

7. In an apparatus of the character described, a support for drill bits, means for adjustably securing bits in said support so as to permit a cutting edge thereof to be variably inclined both longitudinally and transversely, a carbon block engaging the side of said cutting edge, and means for varying the angle of the carbon block in accordance with the variation in transverse inclination of the cutting edge of the bit.

8. In an apparatus of the character described, a vise for supporting drill bits, legs for said vise, one of which is adjustable to provide longitudinal inclination of the drill bit, said vise permitting rotation of the bit therein to provide transverse inclination to the cutting edge of the bit, and a carbon block adjustably carried by said support so as to engage the side of the cutting edge regardless of the inclination of the cutting edges.

9. In an apparatus of the character described, a vise for supporting drill bits, rear legs and an adjustable front leg for said vise, means for adjusting the front leg to produce a longitudinal inclination of the drill bit, said vise permitting transverse inclination of the cutting edges of the bit, an arm pivoted to the vise for vertical adjustment, a block slidable on said arm, a shaft slidably extending transversely through said block, a carbon block pivotally supported on said shaft, and means for locking the first mentioned block to said arm and shaft.

10. In an apparatus of the character described, the combination of a support, clamping jaws on said support for supporting an article, arms secured to said support on both sides of said clamping jaws, and a carbon block secured on one of said arms and engaging one side of the article being supported.

11. In an apparatus of the character described, the combination of a support for a drill bit, means for securing said bit in said support with its cutting edge inclined, a carbon block on said support engaging the side of the cutting edge at any and all degrees of inclination thereof, and means for adjusting the carbon block to accommodate bits of varying size.

In testimony whereof I hereunto affix my signature.

CHARLES CULBERSON GOOLSBEE.